US006810033B2

(12) United States Patent
Derks

(10) Patent No.: US 6,810,033 B2
(45) Date of Patent: Oct. 26, 2004

(54) TRANSMISSION SYSTEM USING PACKET SWITCHED NETWORK

(75) Inventor: Frank P. Derks, Hilversum (NL)

(73) Assignee: Koninklijke Philips Electronics N.V., Einhoven (NL)

( * ) Notice: Subject to any disclaimer, the term of this patent is extended or adjusted under 35 U.S.C. 154(b) by 0 days.

(21) Appl. No.: 09/132,870

(22) Filed: Aug. 12, 1998

(65) Prior Publication Data

US 2002/0080801 A1 Jun. 27, 2002

(30) Foreign Application Priority Data

Aug. 13, 1997 (EP) ............................................. 97202504

(51) Int. Cl.$^7$ ................................................ H04L 12/66
(52) U.S. Cl. ...................................... 370/352; 370/401
(58) Field of Search ................................. 370/352, 353, 370/354, 356, 401; 379/88.17, 88.12; 709/203, 249

(56) References Cited

U.S. PATENT DOCUMENTS

| | | | | |
|---|---|---|---|---|
| 5,608,786 A | | 3/1997 | Gordon | 379/100 |
| 5,726,984 A | | 3/1998 | Kubler et al. | 370/349 |
| 5,751,706 A | | 5/1998 | Land et al. | 370/352 |
| 5,864,610 A | * | 1/1999 | Ronen | 379/127 |
| 5,889,774 A | | 3/1999 | Mirashrafi et al. | 370/352 |
| 5,907,547 A | * | 5/1999 | Foladare et al. | 370/352 |
| 5,907,610 A | * | 5/1999 | Onweller | 379/242 |
| 5,970,126 A | * | 10/1999 | Bowater et al. | 379/114 |
| 5,995,606 A | * | 11/1999 | Civanlar et al. | 379/201 |
| 6,028,917 A | * | 2/2000 | Creamer et al. | 379/100.01 |
| 6,069,890 A | | 5/2000 | White et al. | 370/352 |
| 6,078,582 A | | 6/2000 | Curry et al. | 370/356 |
| 6,088,430 A | * | 7/2000 | McHale | 379/43.28 |
| 6,167,042 A | * | 12/2000 | Garland et al. | 370/354 |
| 6,192,045 B1 | * | 2/2001 | Williams et al. | 370/352 |
| 6,584,094 B2 | * | 6/2003 | Maroulis et al. | 370/352 |

* cited by examiner

Primary Examiner—Kenneth Vanderpuye
(74) Attorney, Agent, or Firm—Dicran Halajian

(57) ABSTRACT

In a communication network, a first terminal is arranged for communication with a second terminal via a packet switched network. The first terminal is connected via a first gateway to the packet switched network, and the second terminal is connected via a second gateway to the packet switched network. If the second gateway is connected via a dial up connection over a public telephone network, the second gateway (24) may not be connected to the packet switched network resulting in a failure when the second terminal attempts to contact the second terminal via the packet switched network. To avoid this situation, the first gateway is arranged for dialing the second gateway directly via the public telephone network and requesting that the second gateway connect to the packet switched network. After the second gateway connects to the packet switched network, the first terminal can connect the second terminal via the packet switched network.

3 Claims, 3 Drawing Sheets

TRANSMISSION SYSTEM USING PACKET SWITCHED NETWORK

FIELD OF THE INVENTION

The present invention is related to a communication system comprising at least a first node and a second node, the first node and the second node comprising a gateway being connectable to a packet switched network for interconnecting said first and second node.

The present invention is also related to a node for use in such a communication system and to a communication method.

With the current Private Virtual Networking (PVN) solution in advanced PABXes such as the Philips SOPHO iS3000 series, a private virtual network is established using dial-on-demand connections through the public circuit switched telephone network. The connection is called virtual, because the actual connections between the nodes in the network reside in the public network and are only present when information needs to be exchanged between nodes. If there are no available (unused) connections between nodes participating in a call, a normal public network call is initiated, to establish a transparent channel through the public network. If required, several public network calls are made to establish sufficient resources across the public network.

Communication between two nodes requires exactly one signalling channel and zero or more user channels. The signalling channel is used to set up the actual end-to-end call and offer PBX facilities to the users across the entire (private virtual) network. The user channels are used to transport the user (voice) information.

With the advent of Internet telephony, companies have shown that it is possible to use a packet switched network such as the Internet, rather than the Public Switched Telephone Network (PSTN) to carry telephony traffic. Certain scenarios also show that carrying telephony traffic on the Internet can be much more cost-effective than using the PSTN. This is especially the case when the connection to the Internet is a local connection. Companies can save on their long distance and international calls when these are routed through the Internet, using a local connection to an Internet Service Provider (ISP). Several companies have already come up with products which enable the interconnection of PBXs to the Internet. These products, known as gateways, interface to PBXs on one side and to the Internet on the other side.

The gateway's function is to encode, compress and package the voice information originating from the PBX into packets and transmit these packets on the Internet and vice versa. In addition to this, these gateways exchange control information across the Internet. The control information contains information to set up the actual end-to-end call. This is similar to the use of the signalling channel used in SOPHO iS3000 PVN (see above). It is also possible to use additional control flows between gateways. For example, gateways could monitor the presence and availability of one another.

As mentioned in the introduction, gateways interface PBXs to the public Internet. The connection to the Internet can be either via a leased line or a dial-up link. The choice is a matter of economics. In the case of a dial-up link, two situations can be considered. In the first case, the dial-up links are established for the duration of the office hours and are not present at any other time. In the second case, the dial-up links are set up on-demand whenever a connection is required between two nodes in the PVN. Again, the choice is a matter of economics. The first case is straightforward and relatively easy to implement: simply establish the connections when office hours begin and tear them down when office hours end. The second case, however, poses some technical challenges, which are explained below.

In the SOPHO iS3000 PVN solution it is easy to set up an on-demand connection to another node in the network because both nodes are connected to the PSTN. When two nodes are supposed to communicate through the Internet, using dial-up connections, then a problem arises when the dial-up connections are not (yet) present. Obviously, the originating node can initiate a dial-up connection to the Internet when a call needs to be made to another node, but how does the node to which that call is destined know that it has to establish a connection as well.

SUMMARY OF THE INVENTION

The object of the present invention is to provide a solution for the above mentioned problem.

To provide a solution to the above mentioned problem the transmission system according to the invention is characterized in that at least the first node is arranged for requesting via a dial up connection, the second node to connect to the packet switched network in orer to enable a connection between the first node and the second node via the packet switched network.

By requesting the second node via a dial up connection to connect to the packet switched network, and by subsequently completing the call via the packet switched network, an easy way of establishing calls is obtained. It is observed that the call needed to request the node to connect to the packet switched network can be very short. Consequently the costs of such a call is very low.

An embodiment of the invention is characterized in that the first node is arranged for including the request into a connection set up message, and in that the second node is arranged for extracting the request from the connection set up message without answering the call from the first node.

By transferring the request to connect to the packet switched network by means of a set up message, it is possible to transfer said information without a call being actually established. If the second node is arranged for extracting the request from the set up message without answering the call, no calling costs are incurred at all for transferring the request. The present invention will now be explained with reference to the drawing figures.

DETAILED DESCRIPTION OF THE PREFERRED EMBODIMENTS

Figure 1:
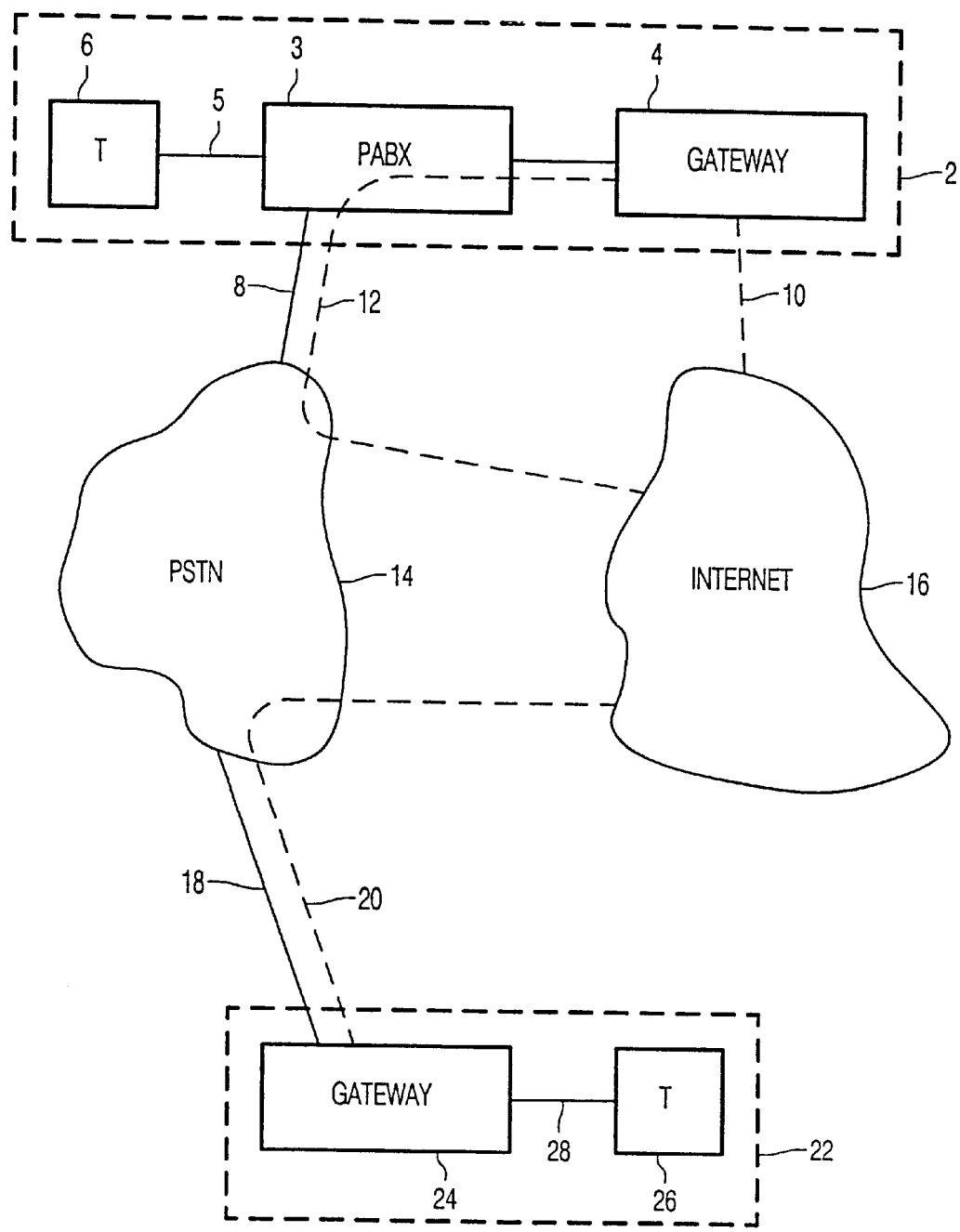
FIG. 1 shows a communication network according to the invention.

In the communication network according to FIG. 1, a node 2 comprises a gateway 4 to which a telephone terminal 6 can be connected via a telephone switch which is here a PABX 3. It is however possible that the telephone switch is a switch in the public telephone network. The gateway 4 is connected to a telephone network 14 via a link 8 which is routed via the PABX 3. The gateway 4 is also connected to the packet switched network 16 which can be the public Internet. Alternatively the connection of the gateway 4 to the packet switched network 16 can be a dial up connection or a leased line 12 routed via the PABX 3 to the telephone network 14 as is indicated by the dotted line.

The connection 5 between the terminal 6 and the gateway 4 can be a telephone line which is connected via the PABX 3 to the gateway 4, but it is also possible that the functions of the gateway 4 and the terminal 6 are included in a single device, such as a personal computer or a telephone terminal specially arranged for Internet telephony.

When the terminal 6 is connected to the gateway 4 via the PABX 3, the terminal 6 initiates a call by going off hook and dialing a number corresponding to the gateway 4. The gateway 4 accepts the call and the terminal 6 provides the (IP) address of the gateway 24 and the terminal 26 to be called to the gateway 4. If only one terminal is connected to the gateway 24 to be called, which is the case when the gateway function is integrated in a PC or in a special internet phone device, only the internet address of the gateway 24 is given.

It is also possible that the gateway 4 does not answer the call initiated by terminal 6, but that it only reads the numbering/addressing information in the 'called party number', "called party subaddress" and/or 'keypad facility' information elements which are included in an ISDN set up message.

Alternatively, it is also possible that the address information of the terminal to be called is stored in the PABX, and that a normal telephone number is assigned to said terminal. If said number is called, the PABX retrieves the complete address information and tries to contact the terminal via the packet switched network.

After having received the address of the terminal 26 to be called from the terminal 6, the gateway 4 attempts to contact the gateway 24 in the node 22 via the Internet 16. If this attempt is successful, the addressing information of the terminal 26 is passed via the Internet 16 to the gateway 24, which tries to set up a connection with the terminal 26 via the link 28. When the terminal 26 accepts the connection, this is signalled by the gateway 24 to the gateway 4, after which a connection between the terminal 6 and the terminal 26 is established.

If the attempt of the gateway 4 to contact the gateway 24 via the Internet 16 fails, it is assumed that the gateway 24 is not connected to the Internet 16. In that case, the gateway 4 calls the gateway 24 directly via the PSTN using a telephone number stored locally, in order to request that the gateway 24 connects to the Internet 16. After the request has been transmitted, the gateway 4 directly terminates the connection with the gateway 24, in order to minimize the connection costs. Alternatively the request to connect to the internet can be included in an ISDN set up message which will be passed by the PSTN to the gateway 24 before a call is established. The latter possibility has the advantage that no connection costs are incurred at all. In response to this request, the gateway 24 connects to the Internet 16. In general this will be done via a dial up connection over the PSTN 14 via the link 18.

It is observed that it is also possible to pass the address of the calling terminal/gateway combination to the gateway during the request to connect to the packet switched network. This has the advantage that the gateway 24 directly can call the gateway 4 after it has connected to the packet switched network 16. It is thereby prevented that the calling gateway has to wait a before contacting the called gateway over the packet switched network until it is ensured that the called gateway has connected to the packet switched network. Because this waiting time is not known, the calling gateway has to wait longer than is necessary.

If the gateway 4 is connected to the Internet 16 via a dial up connection over the telephone network 14 when the gateway 24 should be called directly, the call to the Internet 16 is terminated and the gateway 24 is called. After having transmitted the request to connect to the internet 16 to the gateway 24 the gateway 4 connects again to the Internet 16 and again tries to contact the gateway 24 for establishing a call between the terminals 6 and 16. If the gateway 4 has a fixed connection 10 to the Internet or when is has more than one line available to the PSTN 14, it can stay connected to the Internet 16 when calling the gateway 24 directly.

Figure 2:
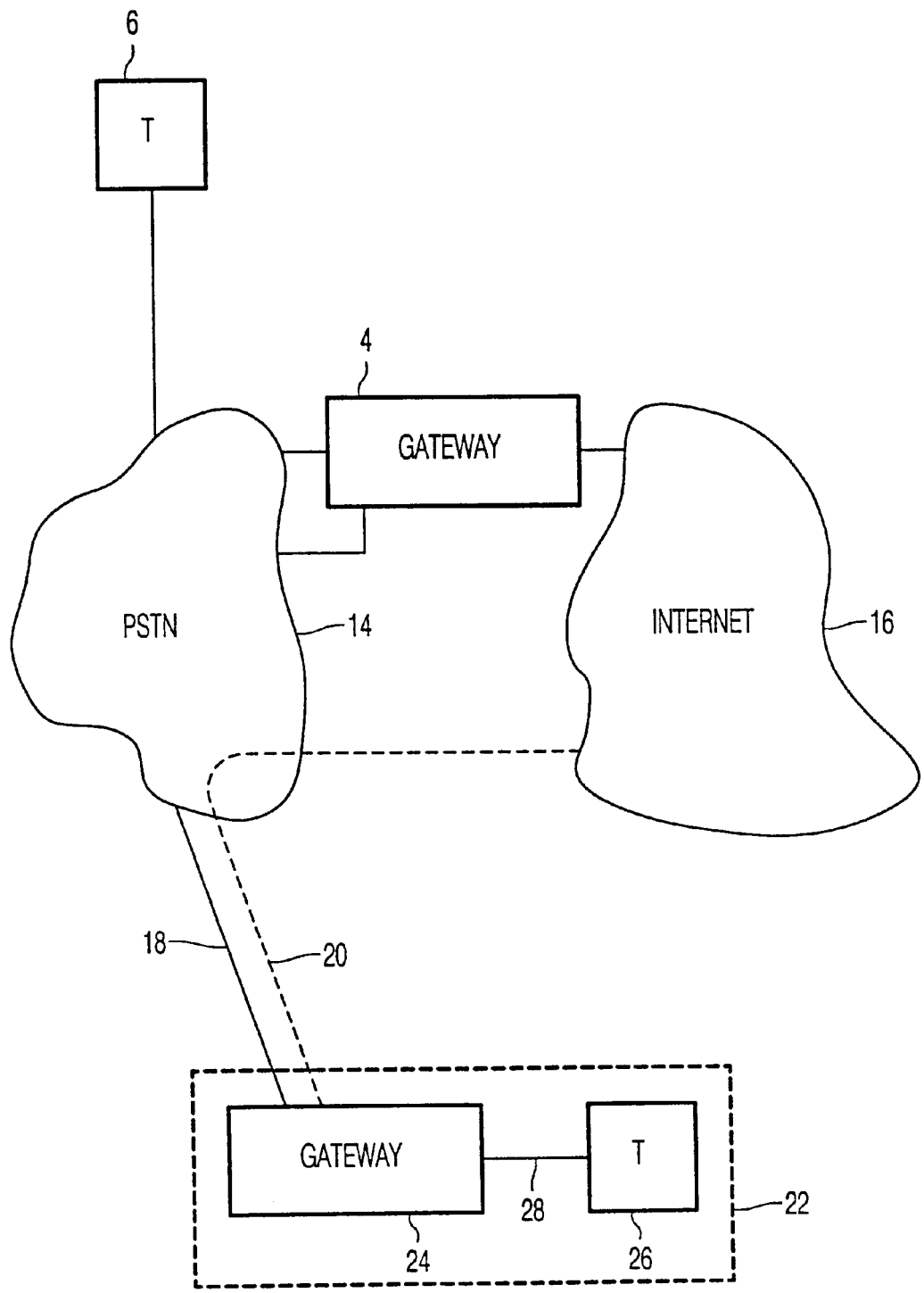
FIG. 2 shows an alternative arrangement of the communication network according to the invention.

In the network according to FIG. 2, the gateway 4 is present between the PSTN network 14 and the Internet 16. If the terminal 6 wants to contact the gateway 4 in order to contact a terminal 24 via the Internet 16, it dials the phone number of the gateway 4 to make a connection. In the present proposal it is possible that the gateway does not answer calls to obtain information about the actual destination of the call, but uses the numbering/addressing information in the 'called party number', "called party subaddress" and/or 'keypad facility' information elements according to the ITU-T Q.931 recommendations or recommendations derived therefrom, such as Euro ISDN. It is also possible that the gateway answers the call before numbering addressing information is exchanged. The gateway uses this numbering information to set up a call to the destination terminal 26. The destination telephony device 26 or the combination of a destination gateway and a (directly or indirectly) connected normal telephony device have a means of identifying and indicating that the telephony device is in the alerting state. The gateway sends an 'alerting" message to the caller or network when it is informed that the IP-based telephony device or the normal telephony device behind a gateway is in the alerting state. The caller has a means of supplying the required addressing/numbering information and place that information in the 'called party number', 'called Party subaddress'information elements' and/or 'keypad facility' information elements.

A first advantage of this way of setting up a call is that the caller does not incur calling cost until the destination really answers the call. A second advantage is that the behaviour of the destination telephony device, as seen from the caller at the terminal 6 is identical to the behaviour of a destination telephony device that is reached directly through the telephone network.

Figure 3:
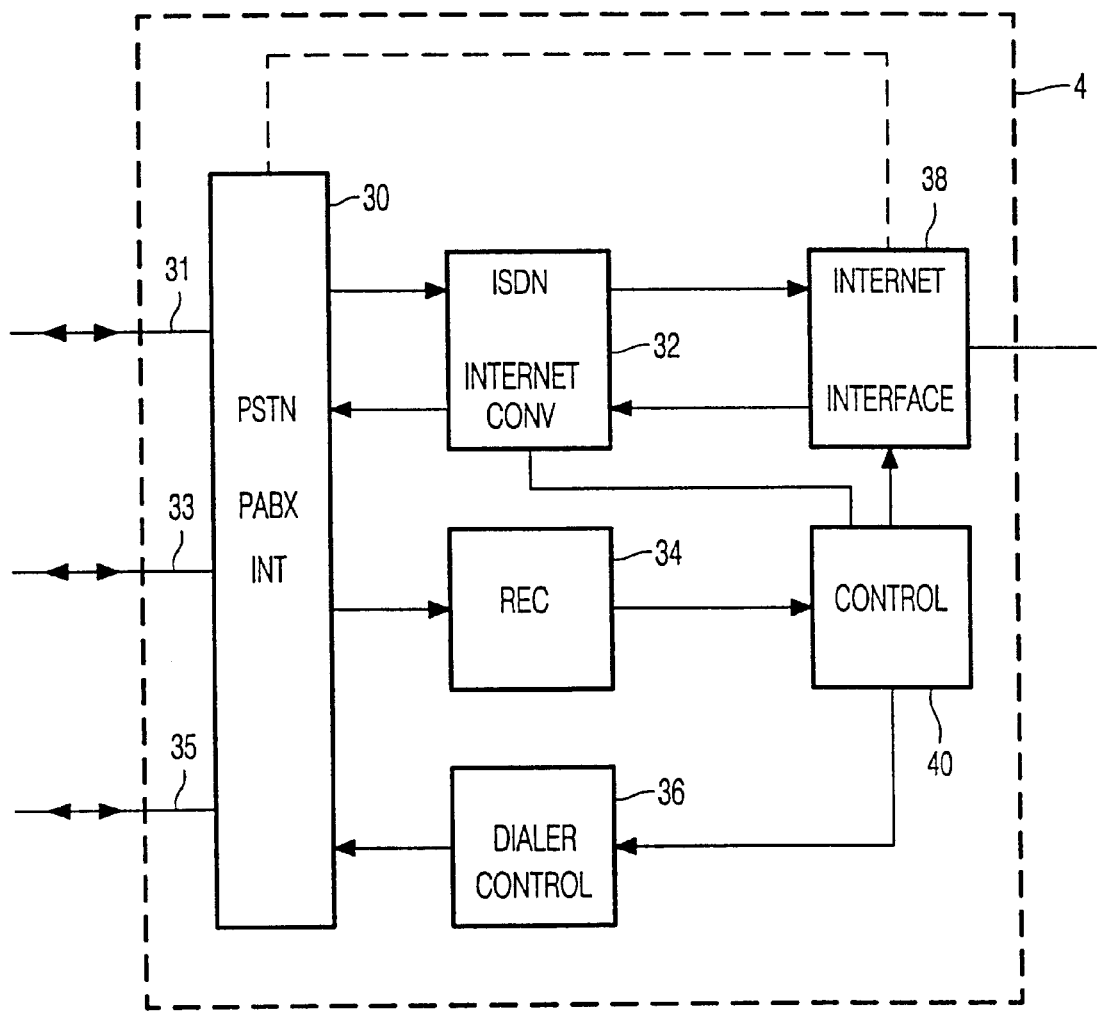
FIG. 3 shows a block diagram of a gateway according to the invention.

The gateway 4 according to FIG. 3 comprises an interface 30 for interfacing to the PABX 3 or to a local exchange of the PSTN. The interface 30 is connected to a plurality of telephone lines 31, 33 and 35. It is also possible that the interface 30 is connected to the PABX or the PSTN via an E1 (Europe) or T1 (US, Japan) line.

The interface 30 is connected via a protocol converter 32 to an Internet interface 38. The protocol converter 30 is arranged for converting the speech signal and the associated control signals received from the interface 30 into signals which can be transmitted via the Internet. Furthermore the protocol converter 32 is arranged for converting the signals received from the Internet into signals which can be transmitted via the telephone interface 30. The conversion of the signals from the interface 30 to signals to be transmitted over the Internet interface 38 involves speech compression and packetizing the compressed speech signals into packets for transmission over the Internet. If the interface 30 is connected to an analog telephone network, the protocol converter 32 also performs analog to digital conversion. The conversion of the signals from the interface 38 to the signals for the interface 30 involves depacketizing the packets received from the interface 38 into a signal stream, and decompressing the signal stream into a digital speech signal. If the interface 30 is connected to an analog telephone network, the digital speech signal is also converted to an analog signal.

The internet interface 38 can be fixedly connected to the Internet, but it is also possible that the Internet interface 38 is connected to the telephone interface 30, in order to connect to the Internet via a dial up connection.

The interface 30 is also connected to a control signal receiver 34 which is arranged for receiving the control signals associated with a connection to the telephone network. If the interface 30 is connected to an analog telephone network, the control signal receiver 34 comprises a tone detector for detecting various signalling tones received from the telephone network and converting them into a corresponding control message. If the telephone interface 30 is connected to an ISDN telephone network, the control signal receiver 34 is arranged for extracting several control messages from the control signals received from the telephone network. Examples of such control messages can e.g. be addressing information carried in an ISDN set up message as explained above.

The control signals at the output of the control signal receiver 34 are passed to a controller 40 which interprets the control signals and takes appropriate actions by sending control signals to a dialler/control signal transmitter 36, to the protocol converter 32 and to the internet interface 38.

If the gateway 4 receives via the interface 30 a set up message including the address information of a terminal to be called via the internet, the control signal receiver 34 extracts the address information from the set up message and passes it to the controller 40. The controller 40 requests the internet interface 40 to set up a (virtual) connection between said internet interface 40 and the gateway identified with the internet address carried by the set up message. After the connection has been set up, optionally a terminal identification signal is transmitted over the connection in order to address one out of more terminals connected to the remote gateway. The remote gateway signals the status of the remote terminal (alerting, in use, off hook) via the Internet interface to the controller 40. If the remote terminal goes off hook, the controller 40 instructs the dial/control interface 36 to accept the telephone call corresponding to the previously received set up message. Furthermore the protocol converter 32 is instructed to pass the converted signals from the telephone interface 30 to the Internet interface 38 for transmission to the remote gateway.

If the called terminal does not answer the call, the gateway 4 does not answer the call of the calling terminal. This way of dealing with the incoming call has the advantage that no calling costs are incurred before the remote terminal actually answers the call.

If the attempt to contact the remote gateway fails, the controller 40 instructs the dial/control interface 36 to dial the telephone number of the remote gateway in order to request that the remote gateway connects to the Internet. Subsequently the gateway 4 tries again to connect to the remote gateway via the Internet.

If the gateway 4 does not have a fixed connection to the internet, it should connect to the internet via a dial up connection. In that case, the control signal receiver 34 is arranged for receiving a message from a remote gateway requesting the gateway 4 to connect to the internet. In response to said request the controller instructs the dial/control interface 36 to establish a dial up connection to the Internet.

What is claimed is:

1. A customer premise communication system, comprising:
   at least a first node including an interface to a circuit switched network; and
   a second node,
       wherein the first node and the second node both include a gateway being connectable to a packet switched network for interconnecting the first node and the second node, and at least the first node is arranged for requesting via the interface to the circuit switched network, the second node to connect to the packet switched network in order to enable a connection between the first node and the second node via the packet switched network, and
       wherein the first node is arranged for including a request and its network address into a connection set up message, and the second node is arranged for extracting the request and the network address from the connection set up message without answering the call from the first node.

2. A gateway for a customer premise communication system, comprising:
   a first interface to a packet switched network;
   a second interface to a circuit switched network;
   a receiver capable of receiving a connection setup up message via the second interface, the connection setup message including a request to connect to the packet switched network via the first interface and a network address to connect to a node in the customer premise communication system via the connection to the packet switched network; and
   a connector for connecting the gateway to the packet switched network in response to the request received via the second interface,
       wherein the request and the network address are extracted without answering a call from the node.

3. A method for a customer premise communication system including at least a first node and a second node, the nodes being connectable to a packet switched network for interconnecting the first node and the second node, the method comprising the steps of:
   communicating a request, via a circuit switched network, for the second node to connect to the packet switched network in order to enable a connection between the first node and the second node via the packet switched network; and
   receiving the request and a network address of the first node at the second node without an answering of a call associated with the request by the second node.

* * * * *